(12) United States Patent
Dawson et al.

(10) Patent No.: US 7,929,421 B2
(45) Date of Patent: Apr. 19, 2011

(54) APPLICATION DRIVEN ROUTER REDUNDANCY PROTOCOL

(75) Inventors: Devon Dawson, Rocklin, CA (US); Mohamed Hamedi, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1889 days.

(21) Appl. No.: 10/967,826

(22) Filed: Oct. 18, 2004

(65) Prior Publication Data
US 2006/0092912 A1    May 4, 2006

(51) Int. Cl.
*H04J 1/16* (2006.01)
(52) U.S. Cl. .................... 370/219; 370/217; 370/220
(58) Field of Classification Search .................. 370/216, 370/218, 219, 342, 217, 220
See application file for complete search history.

(56) References Cited

U.S. PATENT DOCUMENTS

| | | | |
|---|---|---|---|
| 5,473,599 A * | 12/1995 | Li et al. ........................ 370/219 |
| 6,148,410 A * | 11/2000 | Baskey et al. .................... 714/4 |
| 6,295,558 B1 * | 9/2001 | Davis et al. .................... 709/224 |
| 6,327,243 B1 * | 12/2001 | Gregorat ........................ 370/218 |
| 6,392,990 B1 * | 5/2002 | Tosey et al. .................... 370/218 |
| 6,556,547 B1 * | 4/2003 | Srikanth et al. ............... 370/317 |
| 6,581,166 B1 * | 6/2003 | Hirst et al. ........................ 714/4 |
| 6,885,633 B1 * | 4/2005 | Mikkonen ...................... 370/217 |
| 6,901,594 B1 * | 5/2005 | Cain et al. ...................... 719/310 |
| 7,005,053 B2 * | 2/2006 | Yamazaki et al. ............. 204/602 |
| 7,010,716 B2 * | 3/2006 | Yu et al. .............................. 714/4 |
| 7,036,051 B1 * | 4/2006 | Fernandes ........................ 714/55 |
| 7,076,696 B1 * | 7/2006 | Stringer .......................... 714/47 |
| 7,092,354 B2 * | 8/2006 | Jensen .......................... 370/218 |
| 7,096,383 B2 * | 8/2006 | Talaugon et al. ................ 714/21 |
| 7,152,179 B1 * | 12/2006 | Critchfield .......................... 714/4 |
| 7,209,435 B1 * | 4/2007 | Kuo et al. ...................... 370/219 |
| 7,433,317 B2 * | 10/2008 | Kobayashi et al. ............ 370/241 |
| 7,567,505 B2 * | 7/2009 | Iijima et al. ................... 370/216 |
| 7,587,465 B1 * | 9/2009 | Muchow ....................... 709/209 |
| 7,769,862 B2 * | 8/2010 | Singh et al. .................... 709/226 |
| 2001/0048661 A1 * | 12/2001 | Clear et al. .................... 370/218 |
| 2002/0186653 A1 * | 12/2002 | Jensen .......................... 370/219 |
| 2003/0233473 A1 * | 12/2003 | Bonhomme et al. .......... 709/238 |
| 2004/0215821 A1 * | 10/2004 | Regan et al. ................... 709/240 |
| 2006/0077922 A1 * | 4/2006 | Geilfus et al. ................. 370/317 |

OTHER PUBLICATIONS

HP Procurve Series 2500 Management and Configuration Guide, Aug. 2000. [webpages][online]. Retrieved on Oct. 7, 2004. Retrieved from the internet: ftp://ftp.hp.com/pub/networking/software/59692354.pdf. Total pp. 392.

* cited by examiner

*Primary Examiner* — Ricky Ngo
*Assistant Examiner* — Dewanda Samuel

(57) ABSTRACT

In an embodiment of the invention, a method for providing a router redundancy in a network, includes: monitoring a primary router for a failure event; and selecting a fail-over router to assume the role of the primary router if the failure event occurs in the primary router. The fail-over router is selected and configured by the use of a Router Redundancy Protocol (RRP) application software in a computer.

16 Claims, 3 Drawing Sheets

APPLICATION DRIVEN ROUTER REDUNDANCY PROTOCOL

TECHNICAL FIELD

Embodiments of the invention relate generally to communication networks, and more particularly to an application driver Router Redundancy Protocol.

BACKGROUND

In networking technology, the Router Redundancy Protocol (RRP) is used to provide fail-over support (i.e., router redundancy support) in Layer-3 networking devices (i.e., routers). RRP exists in various vendor specific implementations such as, for example, V.R.R.P (Virtual Router Redundancy Protocol), X.R.R.P. (Extended Router Redundancy Protocol) which is provided by HEWLETT-PACKARD COMPANY, and H.S.R.P. (Hot Standby Router Protocol). RRP essentially creates one virtual router from two routers so that if a primary router that provides connections for network users to resource (e.g., the Internet or other networks) fails, then RRP permits a secondary router (i.e., (the fail-over router) to assume the functions of the primary router, so that the users can continue to access the resource via the secondary router. The fail-over functionality from the primary router to the secondary router is invisible (transparent) to the network users, so that the users' connection to the resource is not disturbed when the routing functions fails-over from the primary router to the secondary router.

The current implementations of RRP rely on firmware that is implemented within the router device itself to provide the necessary configuration (e.g., IP addresses of the primary router and secondary router, IP address associated with the virtual router formed by the physical device routers), fault detection, and fail-over functionality. In other words, the router devices are directly configured in order to implement the RRP functionalities. However, current implementations of RRP limit the number of routers to only two routers (the primary router and the secondary router). Additionally, current implementations require the routers to be from the same manufacturer who supports the same implementation type for RRP. Therefore, the current RRP implementations are unable to use routers with no built-in RRP support.

Therefore, the current technology is limited in its capabilities and suffers from at least the above constraints and deficiencies.

SUMMARY OF EMBODIMENTS OF THE INVENTION

In an embodiment of the invention, an apparatus for providing a router redundancy in a network, includes: a primary router; a fail-over router; and a computer including a Router Redundancy Protocol (RRP) application software configured to monitor the primary router for a failure event and configured to permit the fail-over router to assume the role of the primary router if the failure event occurs in the primary router. The fail-over router may be selected from a set of routers in a router pool.

In another embodiment of the invention, a method for providing a router redundancy in a network, includes: monitoring a primary router for a failure event; and selecting a fail-over router to assume the role of the primary router if the failure event occurs in the primary router. The fail-over router is selected and configured by the use of the RRP application software in a computer.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

An embodiment of the invention uses an RRP application software that is external to the router, in order to mimic the redundant router functionality. A standard computer device (e.g., personal computer or other computing device) that is running the RRP application software can be configured to create and designate a redundant router (or create and designate a router from a set of routers), where the designated redundant router is accessible on the network. This RRP application software would then detect a failure of the primary router and automatically configure the designated redundant (secondary) router to take over the failed primary router's functions and responsibilities on the network.

An embodiment of the invention provides at least one of the following possible advantages. An embodiment of the invention is "vendor neutral", which means that the RRP application software is applicable to any router that can be remotely configured by the computer. In other words, an embodiment of the invention can be applied to network devices with no built-in RRP support. Therefore, an embodiment of the invention permits RRP functionality to be added to a network device with no built-in RRP support.

An embodiment of the invention can provide a deeper set of functionalities. For example, an embodiment of the invention can allow any number of network devices to be configured as a backup router (which acts as the fail-over router when the primary router fails). In contrast, current RRP implementations are typically constrained to one primary router and one secondary router. Therefore, an embodiment of the invention expands the range of possible functionalities by allowing an RRP application software to specify the actions to take in the event of a failure in the primary router.

Figure 1:
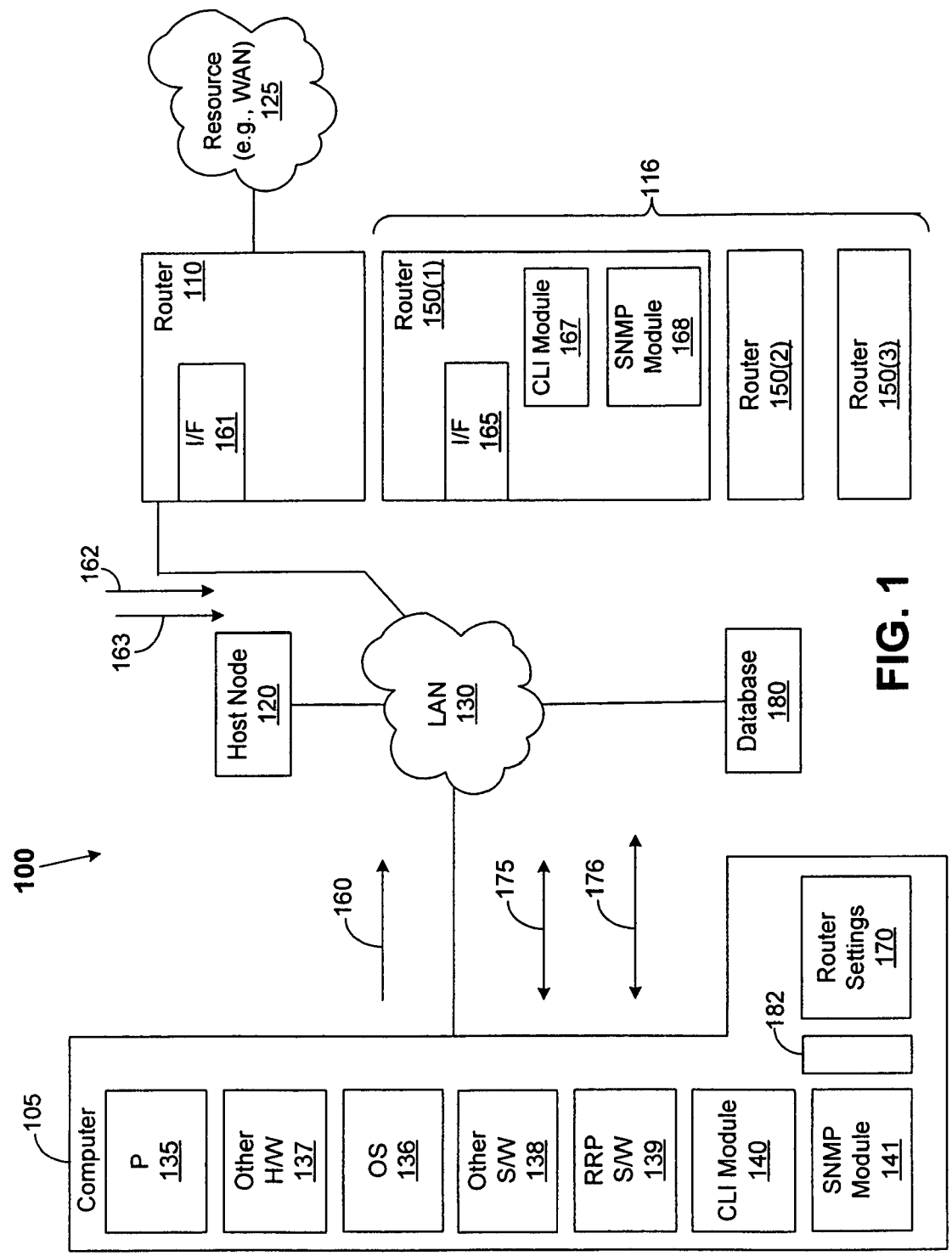
FIG. 1 is a block diagram of a network system that provides for router redundancy, in accordance with an embodiment of the invention.

FIG. 1 is a block diagram of a network system (apparatus) 100 that provides for router redundancy, in accordance with an embodiment of the invention. The network system 100 includes a computer 105, a router 110, and a router pool 116 that is formed by one router or by a set of multiple routers. The router 110 serves as the primary router for permitting one host node 120 (or multiple host nodes 120) to access a resource 125 which may be, for example, a Wide Area Network (WAN) such as the Internet or other communication network. The host node 120 is typically connected to the router 110 via a Local Area Network (LAN) 130. The host node 120 can be, for example, a computing device such as a personal computer or a server.

As known to those skilled in the art, a router acts as a default gateway for a host node in a network. A gateway is a network point that acts as an entrance to another network. For example, the gateway can be an entrance point to a wide area network for a node. The router is configured to direct a given packet of data that arrives at the gateway. The router is located at any gateway of at least two different networks and permits the connected different networks to communicate with each other.

On a communication network (e.g., the Internet), a router is typically a device that determines the next network point to which a packet should be forwarded so that the packet can reach its destination. A router may create or maintain a table of the available routes and their conditions, and use this information (along with distance and cost algorithms) to determine the best route for a given packet. Typically, a packet may travel through a number of network points with routers before arriving at its destination. Routing is a function associated with the Network Layer (layer 3) in the Open Systems Interconnection (OSI) model which is the standard model of network programming.

The computer 105 may be any suitable computing device such as, for example, a personal computer, a notebook computer, a laptop, a mini-computer, a server, or another suitable type of computing device.

In an embodiment, the computer 105 includes a processor 135 for executing an operating system 136 and other software 138. The computer 105 may also include other standard hardware 137 for permitting computing operations by the computer 105. Standard hardware 137 can include, for example, memory devices, port devices, peripheral devices, circuitry, and/or other types of hardware components. The operating system 136 manages the software applications that will be executed by the computer 105. The computer 105 also includes other standard software 138 (and/or standard firmware) for permitting computing operations by the computer 105. Standard software 138 can include, for example, device drivers, packet processing software, user interface software, and/or other types of software or firmware.

In an embodiment of the invention, the computer 105 permits a router in a router pool 116 to take over the operations of the primary router 110, if the primary router 110 fails. An RRP application software 139, a Command Line Interface (CLI) module 140, and a Simple Network Management Protocol (SNMP) module 141 permits this redundant router functionality to be performed, as discussed below. The CLI module 140 supports CLI functionalities, while the SNMP module 141 supports SNMP functionalities.

The router pool 116 of routers can include only one router or a plurality of routers. The RRP application software 139 in the computer 105 will select a router in the router pool 116 as the fail-over router in the event that the primary router 110 fails, as discussed in further detail below.

The number of routers in the router pool 116 may vary in number. As an example, the router pool 116 includes only a router 150(1). In another example, the router pool 116 includes the routers 150(1) and 150(2). In yet another example, the router pool 116 includes the routers 150(1), 150(2), and 150(3). In yet another example, the router pool 116 can include the routers 150(1), 150(2), and 150(3), and one or more additional routers. In the description herein, a router in the router pool 116 will be referred to generally as a router 150.

In an embodiment of the invention, the computer 105 is used to configure the routers in the network system 100, so that the primary router 110 is monitored for a failure event, and if the primary router 110 fails, then one of the routers 150 in the router pool 116 is selected as a fail-over router (redundant router) for performing at least some of the operations and functions of the failed primary router 110. Since the computer 105 is used to configure the redundant router functions in the network system 100, the routers in the network system 100 are not required to support an implementation of RRP. The routers in the network system 100 are only required to be any suitable router that can be configured by the computer 105 so that one of the routers 150 in the router pool 116 can serve as the fail-over router after the primary router 110 fails, and so that the fail-over router can permit the host node(s) 120 to access the resource 125.

The RRP application software 139 can be configured to select one of the routers 150 in the router pool 116 to be the fail-over router in any suitable manner. For example, when the primary router 110 fails, then the RRP application software 139 can configure the router 150(1) to be the fail-over router. As another example, when the primary router 110 fails, then the RRP application software 139 can configure a randomly-selected router 150 in the router pool 116 to be the fail-over router. As another example, when the primary router 110 fails, then the RRP application software 139 can configure the routers 150 in the router pool 116 so that the fail-over router is selected by determining in sequence if the routers 150(1) to 150(3) can function as the fail-over router and selecting the first router that the RRP application software 139 has determined as a suitable operational fail-over router.

As mentioned above, the fail-over router can be randomly selected, or alternatively, the fail-over router can be selected by iterating over a set 116 of routers 150. As another alternative, each of the routers 150 in the pool 116 could also be configured with an associated priority value so that the RRP software 139 continues to select the highest priority router until a router is found that can be configured as the fail-over router.

In one specific embodiment of the invention, the router pool 116 can be considered to be one or more of a variety of sources. A separate database 180 contains the details and information associated with each router 150. The RRP software 139 would connect (via, e.g., JDBC, ODBC, SQL, etc.) to the database 180 and retrieve the details of the routers 150, in order to select a fail-over router from the router pool 116. Alternatively, the details of the routers 150 in the pool 116 could be maintained in a separate file 182 which may loaded on (or which may be accessible to) the computer 105 and read when needed, or even stored in memory if the computer device 105 running the RRP application 139 does not have persistent storage.

As also mentioned above, the RRP application software 139 can go through the routers 150 in the router pool 116 in sequence, so that the first properly working router 150 in the pool 116 is selected as the fail-over router. In an embodiment, the RRP software 139 could iterate through the set 116 of routers (where the router selection is ordered or the routers are randomly selected), attempt to configure the router via SNMP, CLI or any other suitable mechanism provided by the computer device 105 (e.g., console connection) and continue the iterations through the router set 116 until a router 150 is found that can be successfully configured as a fail-over router.

In an embodiment of the invention, the RRP application software 139 will create and send polling packets 160 to the primary router 110, in order to detect a failure of the primary router 110. An interface 161 permits the host nodes 120 to connect via the primary router 110 to the resource 125. If the interface 161 in the primary router 110 has not failed and if other failures in the primary router 110 has not occurred, then the primary router 110 will send a polling packet response 162 to the computer 105, in response to the polling packet 160. The polling packet response 162 provides an indication to the RRP application software 139 that the primary router 110 has not failed. After the polling packet response 162 is received by the computer 105, the RRP application software 139 will not permit one of the routers 150 in the router pool 116 to take over the functions of the primary router 110 as a fail-over router.

On the other hand, if the interface 161 in the primary router 110 has failed or if other failures in the primary router 110 have occurred, then the primary router 110 will not send a response packet to the polling packet 160. If the computer 105 does not receive a response packet to the polling packet 160 within a particular time amount (e.g., 2.0 seconds) after the computer 105 has sent the polling packet 160, then RRP application software 139 will permit one of the routers 150 in the router pool 116 to take over the functions of the primary router 110 as a fail-over router. For example, the RRP application software 139 may be configured to select the router 150(1) to become the fail-over router. Other routers 150 in the router pool 116 may be selected by the RRP application software 139 to be the fail-over router.

As another example, if the interface 161 in the primary router 110 has failed or if other failures in the primary router 110 have occurred, then the primary router 110 may send an error message 163 to the computer 105, in response to the polling packet 160. If the computer 105 receives the error message 163, in response to the polling packet 160, then RRP application software 139 will permit one of the routers 150 in the router pool 116 to take over the functions of the primary router 110 as a fail-over router.

In an embodiment of the invention, the RRP application software 139 can access the configuration settings for the primary router 110, by accessing router settings 170 which may be stored in memory in the computer 105. In response to a failure in the primary router 110, the RRP application software 139 will configure the settings in a selected fail-over router 150 (e.g., router 150(1)) based upon the router settings 170. By configuring the settings in the selected fail-over router 150, the selected fail-over router 150 can take over the functions of the primary router 110.

The CLI module 140 and the SNMP module 141 are used to transmit the router settings 170 to the selected fail-over router 150, so that the selected fail-over router 150 can take over the functions of the primary router 110. The router settings 170 will configure the interface 165 in the selected fail-over router 150 to permit the host node(s) 120 to connect via the fail-over router 150 to the resource 125. A CLI module 167 and SNMP module 168 in the selected fail-over router 150 are used to process the transmitted router settings 170, so that the interface 165 is properly configured to permit the host node(s) 120 to connect to the resource 125.

Therefore, the CLI module 140 in the computer 105 and the CLI module 167 in a router 150 permit the computer 105 to establish a CLI session 175 with the selected fail-over router 150, so that the RRP application software 139 can transmit and configure the router settings 170 into the interface 165 of the selected fail-over router 150. Similarly, the SNMP module 141 in the computer 105 and the SNMP module 168 in a router 150 permit the computer 105 to establish an SNMP session 176 with the selected fail-over router 150, so that the RRP application software 139 can transmit and configure the router settings 170 into the interface 165 of the selected fail-over router 150.

As known to those skilled in the art, CLI is one of the fundamental user interfaces. CLI provides a raw interface into the inner workings of the computer. CLI permits communication between a program and its user, based solely on textual input and output. Commands are input with the help of a keyboard or similar device and are interpreted and executed by the program. Results are output as text or graphics to the terminal.

As known to those skilled in the art, SNMP is a family of protocols (SNMPv1, SNMPv2, SNMPv3) that relies on an agent residing on the managed device to provide read/write access to data on the managed device. The structure of this data is defined by one or more management information bases (MIBs). The specific sequence of steps used to configure the router, whether the router is configured by SNMP or CLI, will vary from device to device depending on the syntax utilized by the router's CLI and/or the structure of the router's MIBs.

The RRP application software 139 can be written in any suitable programming language, and can be programmed by use of any standard code programming technique, such that the RRP application software 139 can establish a connection and communication with a router 150 through either an SNMP session or a CLI session.

Additional details on CLI and SNMP are disclosed in, for example, HP ProCurve Switches 2512 and 2524: Management and Configuration Guide, Publication Number 5969-2354, Hewlett-Packard Company (August 2000), which is hereby fully incorporated herein by reference. Additional information on individual CLI commands are found in the "Command Line Interface Reference Guide", which is hereby fully incorporated herein by reference.

The RRP application software 139 permits the number of routers that can be used as the fail-over router in the router pool 116 to vary in number. In contrast, in the current XRRP implementation, the number of routers that can be used as the fail-over router is limited to one. Therefore, if the designated fail-over router fails, then the current XRRP implementation is not able to designate an alternative fail-over router.

In order to configure the MAC (Media Access Control) address of the interface 161 into the interface 165 of the fail-over router 165, special hooks may be used along with the CLI module 140 and SNMP module 141. The special hooks include code that permit the transmission and configuration of the MAC address of the interface 161 to the interface 165.

It should be appreciated that, in alternative embodiments, the network system 100 may include components and products other than those discussed above. Moreover, the network system 100 can be implemented on different operating systems and hardware. Those skilled in the art will recognize that other alternative hardware and software environments may be used without departing from the scope of embodiments of the invention. As such, the exemplary environment in FIG. 1 is not intended to limit embodiments of the invention.

Figure 2:
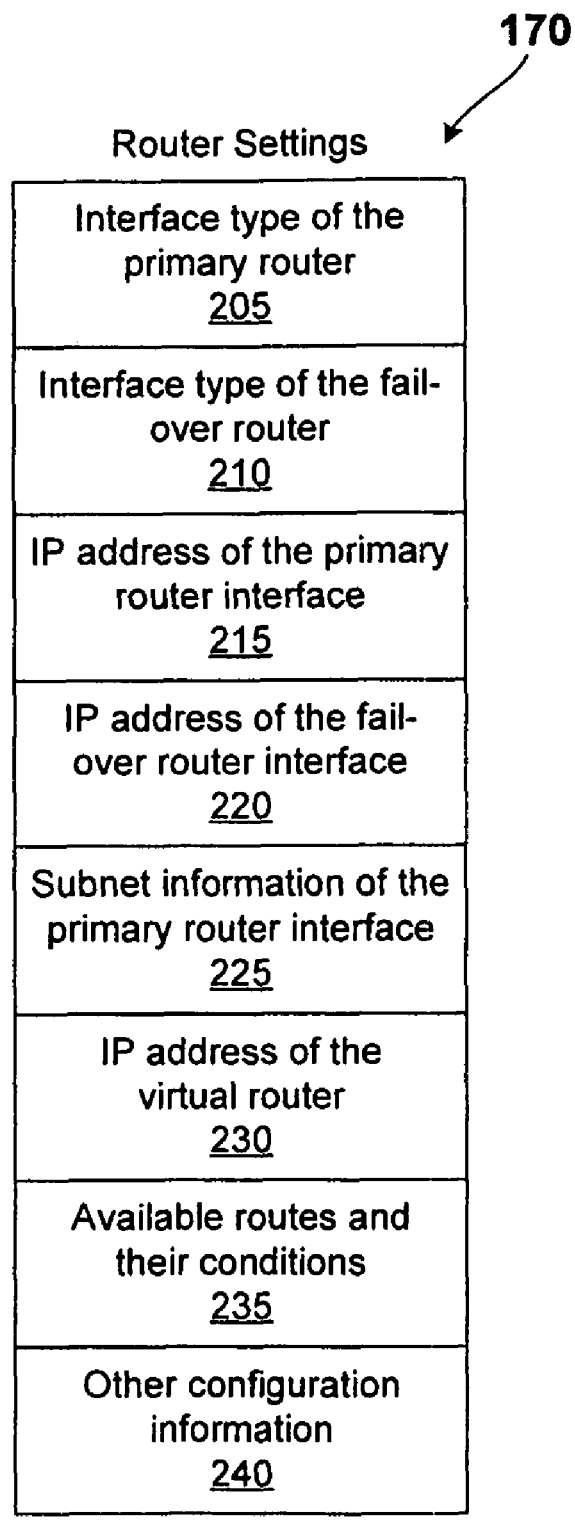
FIG. 2 is a block diagram illustrating some of the parameters in the configuration information that is transmitted by an embodiment of the invention.

FIG. 2 is a block diagram illustrating some of the configuration information in the router settings 170 that is transmitted by an embodiment of the invention.

The router settings 170 includes information 205 on the interface 161 type of the primary router 110.

The confirmation information 170 includes information 210 on the interface 165 type of the selected fail-over router 150. Therefore, each router 150(1) to 150(3) in the router pool 116 may have a corresponding router setting 170 that is stored in the computer 105.

The configuration information 170 also includes the IP address information 215 of the interface 161 in the primary router 110.

The configuration information 170 also includes the IP address information 220 of the interface 165 in the fail-over router 150.

The configuration information 170 also includes the subnet information 225 of the interface 161 in the primary router 110.

The configuration information 170 also includes IP address information 230 associated with the virtual router formed by the physical device routers The configuration information 170 also includes information 235 on available routes and their conditions (e.g., route cost information).

The configuration information 170 also includes other configuration information 240 that is used by the RRP application software 139, so that the RRP application software 139 can configure the interface 165 of the selected fail-over router 150 to permit a host node 120 to access the resource 125 via the selected fail-over router 150.

Figure 3:
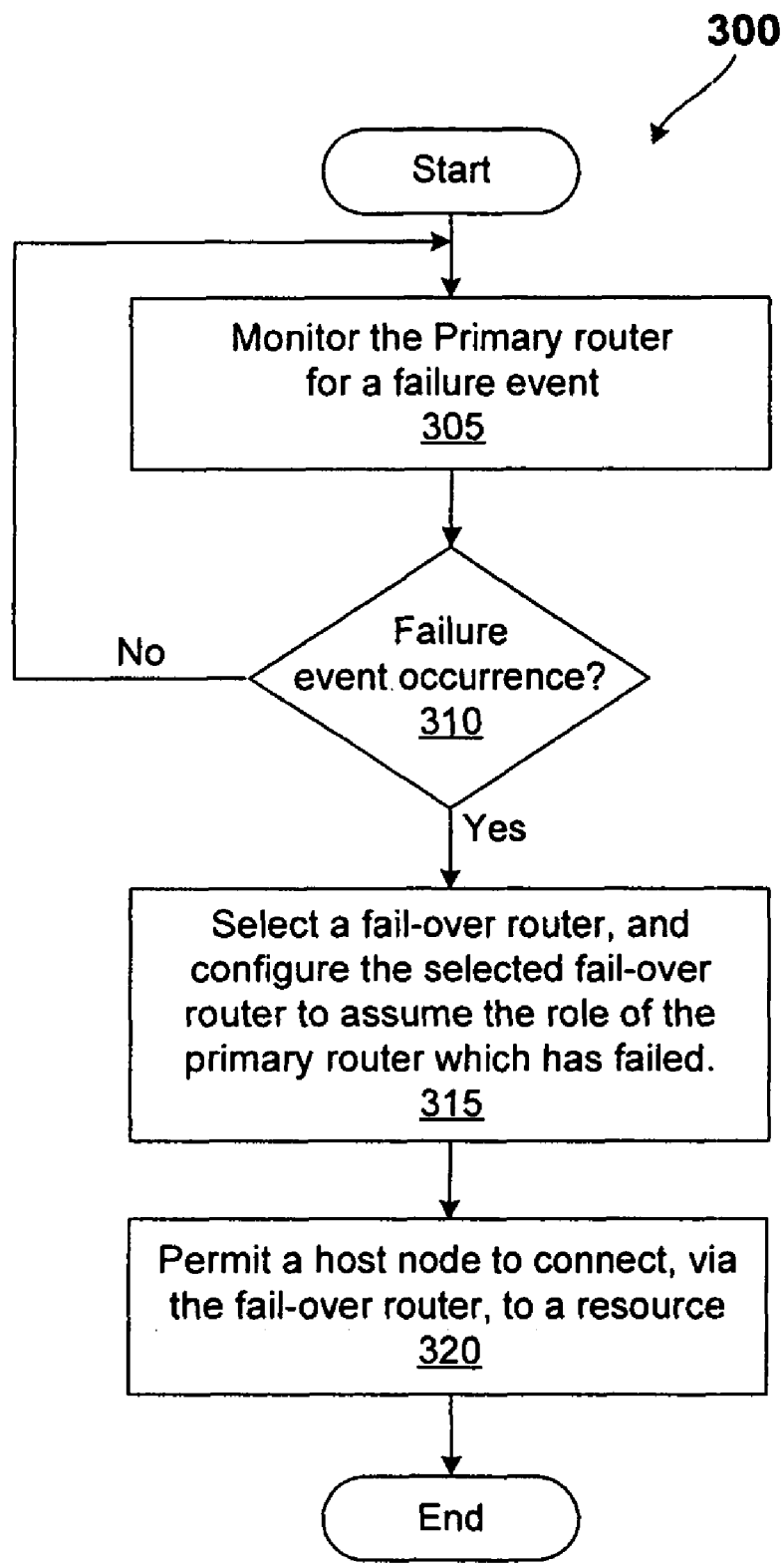
FIG. 3 is a flowchart of a method in accordance with an embodiment of the invention.

FIG. 3 is a flowchart of a method 300 in accordance with an embodiment of the invention. In block 305, the primary router is monitored for a failure event. The primary router is monitored by an RRP application software 139.

In block 310, if a failure event has not occurred, then the method 300 returns to block 305, where the primary router is monitored for a failure event.

In block 310, if a failure event has occurred, then, a fail-over router is selected and configured to assume the role of the primary router which has failed. The RRP application software 139 selects the fail-over router, and an SNMP session or a CLI session is used to configure the selected fail-over router.

In block 320, a host node is permitted to connect, via the fail-over router, to a resource. As an example, the resource may be a wide area network such as the Internet.

Various elements in the drawings may be implemented in hardware, software, firmware, or a combination thereof.

The various engines or software discussed herein may be, for example, computer software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus for providing a router redundancy in a network, the apparatus comprising:
    a primary router;
    a fail-over router; and
    a computer including a Router Redundancy Protocol (RRP) application software configured to monitor the primary router for a failure event wherein the application software transmits a polling packet to the primary router to detect the failure event;
    wherein the application software is configured to permit the fail-over router to assume the role of the primary router if the failure event occurs in the primary router; and
    wherein the application software accesses configuration settings of the primary router in response to the failure event and transmits the configuration settings to the fail-over router.

2. The apparatus of claim 1, wherein the fail-over router is selected from a router pool.

3. The apparatus of claim 1, wherein the primary router permits a host node to connect to a resource.

4. The apparatus of claim 3, wherein the fail-over router permits the host node to connect to the resource if the failure event occurs in primary router.

5. The apparatus of claim 1, wherein the RRP application software polls the primary router, in order to monitor for the failure event.

6. The apparatus of claim 1, wherein the RRP application software configures the fail-over router via a Command Line Interface (CLI) session.

7. The apparatus of claim 1, wherein the RRP application software configures the fail-over router via a Simple Network Management Protocol (SNMP) session.

8. A method for providing a router redundancy in a network, the method comprising:
 monitoring, by an application in a computer, a primary router for a failure event including transmitting, by the application, a polling packet to the primary router;
 detecting, by the application, the failure event based on the polling packet;
 accessing, by the application, configuration settings of the primary router in response to the failure event; and
 selecting the fail-over router to assume the role of the primary router if the failure event occurs in the primary router wherein selecting the fail-over router includes transmitting, by the application, the configuration settings to the fail-over router.

9. The method of claim 8, wherein the fail-over router is selected from a router pool.

10. The method of claim 8, further comprising:
 permitting, by a primary router, a host node to connect to a resource.

11. The method of claim 10, further comprising:
 permitting, by the fail-over router, the host node to connect to the resource if the failure event occurs in primary router.

12. The method of claim 8, wherein the act of monitoring comprises:
 polling the primary router, in order to monitor for the failure event.

13. The method of claim 8, further comprising:
 configuring the fail-over router via a Command Line Interface (CLI) session.

14. The method of claim 8, further comprising;
 configuring the fail-over router via a Simple Network Management Protocol (SNMP) session.

15. An apparatus for providing a router redundancy in a network, the apparatus comprising:
 means for monitoring, by an application in a computer, a primary router for a failure event including means for transmitting, by the application, a polling packet to the primary router;
 means for detecting, by the application, the failure event based on the polling packet;
 means for accessing, by the application, configuration settings of the primary router in response to the failure event; and
 means for selecting the fail-over router to assume the role of the primary router if the failure event occurs in the primary router wherein said means for selecting the fail-over router includes means for transmitting, by the application, the configuration settings to the fail-over router.

16. An article of manufacture, comprising:
 a non-transitory machine-readable medium having stored thereon instructions to:
 monitor, by an application in a computer, a primary router for a failure event and transmit, by the application, a polling packet to the primary router;
 detect, by the application, the failure event based on the polling packet;
 access, by the application, configuration settings of the primary router in response to the failure event; and
 select the fail-over router to assume the role of the primary router if the failure event occurs in the primary router wherein the selecting the fail-over router includes transmitting, by the application, the configuration settings to the fail-over router.

* * * * *